United States Patent [19]

Peek

[11] 4,109,481

[45] Aug. 29, 1978

[54] FROST DETECTOR

[75] Inventor: S. Christopher Peek, Hull, Mass.

[73] Assignee: GTE Sylvania Incorporated, Danvers, Mass.

[21] Appl. No.: 751,236

[22] Filed: Dec. 16, 1976

[51] Int. Cl.² .............................................. F25D 21/02
[52] U.S. Cl. .......................................... 62/140; 62/151; 340/580
[58] Field of Search .......................... 62/140, 128, 151; 340/234; 250/215, 340, 341

[56] References Cited

U.S. PATENT DOCUMENTS

| 3,188,828 | 6/1965 | Wayne | 62/140 |
| 3,961,495 | 6/1976 | Beauvent et al. | 62/140 |
| 4,015,127 | 3/1977 | Sharkins | 250/341 |
| 4,017,194 | 4/1977 | Conroy et al. | 250/341 |
| 4,035,644 | 7/1977 | Ciemochowski | 250/340 |

Primary Examiner—William E. Wayner
Attorney, Agent, or Firm—James Theodosopoulos

[57] ABSTRACT

In a frost detector mounted proximate cooling fins of refrigeration apparatus, an emitter directs pulses of infrared radiation in the direction of the fins. When there is frost buildup on the fins, the frost reflects the radiation back towards a detector, the detector and emitter being mounted at a slight angle to each other.

1 Claim, 3 Drawing Figures

FROST DETECTOR

FIELD OF THE INVENTION

This invention concerns a frost detecting device for use in apparatus of the type having refrigerant-containing coils equipped with fins.

THE INVENTION

Refrigeration systems often collect frost on the cooling coils and fins, which causes the system to operate with less efficiency than would be the case with no frost. Heat pumps are especially affected by frost accumulation on the outdoor unit in winter months when the inside unit is in the heating mode. Outdoor cold temperatures when combined with high humidity produce frost very quickly. In order to eliminate this frost, the heating mode is shifted to the cooling mode on the indoor unit which produces heat in the outdoor unit, causing the frost to melt. Refrigeration systems utilize auxiliary heaters which are turned on to melt frost which accumulates when the refrigerator is opened to high humidity, especially in the summer time. Although many systems have been proposed for the purpose of detecting frost, most heat pump and refrigerator designs incorporates a timer which determines when the defrost cycle is to occur. This can be inefficient, since defrosting does not necessarily occur when it should.

It is an object of this invention to save energy in refrigeration and heat pump systems by initiating a defrost cycle only when it is needed.

This invention discloses a means of detecting frost by a pulsed infrared beam which reflects off the frost and is picked up by an infrared detector having associated circuitry to produce an analog signal which is a positive function of the amount of accumulated frost. This signal is in turn applied to a comparator which turns the defrost mechanism on at a predetermined frost level and then turns the defrost mechanism off at a lesser level. The control of the defrost cycle by means of sensing its level so that a defrost cycle will only be initiated when it is needed and terminated at the proper instant when it is no longer needed, saves energy in refrigeration and heat pump systems over the timer temperature control system normally used. The advantage of a pulsed infrared system is that it greatly reduces susceptibility to ambient light and other unwanted signals or noise.

Figure 1:
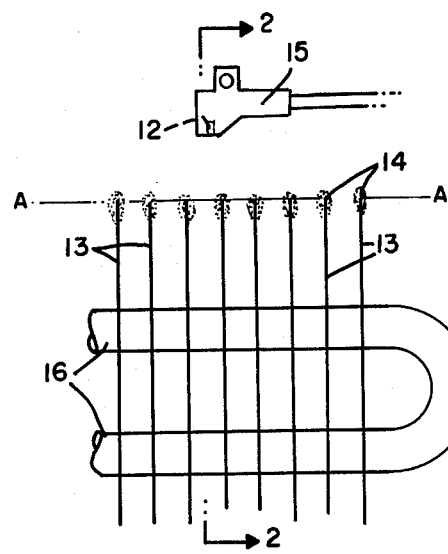
FIG. 1 is a diagram showing the location of a transducer head, containing the emitter and detector, in relation to cooling fins.
Figure 2:
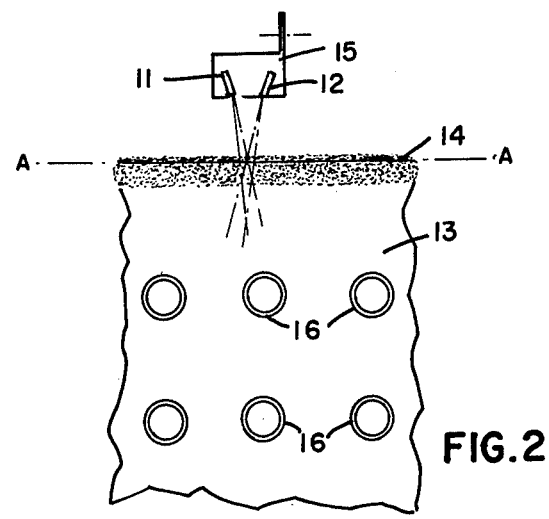
FIG. 2 is a sectional view along line 2—2 of FIG. 1.

As shown in the drawing, a frost detection device in accordance with this invention comprises an emitter 11 and a detector 12 which are angled slightly toward each other, as shown in FIG. 2. Or one element could be straight and the other one angled. In any case, the relative angle between emitter 11 and detector 12 is such that the beam of emitter 11 will intersect the field of view of detector 12 at a predetermined distance, which should be at about the location where frost buildup occurs. Generally, this location will be at about the plane, shown as A—A in FIGS. 1 and 2, which includes the proximate edges of fins 13. Thus, frost buildup 14 on the edge of fin 13 will intercept radiation from emitter 11 and reflect it back to detector 12.

In a specific example, emitter 11 was a light emitting diode which was pulsed at a 2000 hertz frequency to emit infrared radiation at a 10% duty cycle. Detector 12 was a silicon detector for this infrared radiation. Emitter 11 and detector 12 were each about 70 mils in diameter and were mounted in a transducer head 15 about ⅛ inch apart from each other. They were each angled 15° from the center line of head 15, as shown in FIG. 2. The beam spread of emitter 11 and the field of view of detector 12 were each about 12° and intersected at about plane A—A, that is, at about the proximate edge of fin 13, as shown in FIG. 2. The distance from plane A—A, containing the proximate edges of fins 13, to emitter 11 and detector 12 was about ¼ inch.

As shown in FIG. 1, detector 12 and emitter 11 (not visible behind detector 12) can be aligned between two adjacent fins 13, the beam emitted by emitter 11 being parallel to fins 13. The exact longitudinal location is not critical for thin fins mounted close together but for thicker fins mounted further apart it is desirable to avoid mounting directly over the edge of fin 13 in order to avoid specular reflection.

FIG. 2 shows the way the signal is derived. The pulsed infrared emitter 11 radiates a 12° beam between evaporator fins 13. If there is no frost, very little energy is reflected back to detector 12 as a return signal. Evaporator tubes 16 give very little reflection because they are round and are beyond the point where the beam of the emitter and the field of view of the detector overlap. As frost 14 builds up between fins 13, it intersects the beam of the emitter and the field of view of the detector.

Figure 3:
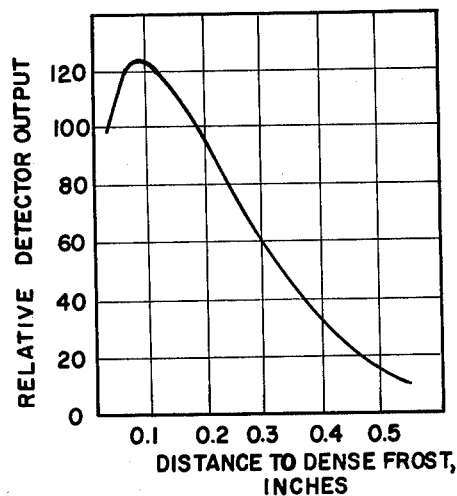
FIG. 3 shows a typical detector output in relation to distance from frost.

A typical detector output is shown in FIG. 3. It can be seen that as the distance between frost buildup 14 and detector 12 decreases, the relative output of detector 12 increases.

The sensitivity and geometry of the system are such that output contacts can be caused to be closed when the frost level is sufficient to restrict the air flow through fins 13. The system is such that the radiated energy simulates air flow, so that the signal is representative of air flow. The emitter and detector are tilted and are narrow in field of view. This greatly aids in eliminating the effect of variations in gain and sensitivity. Rather, the trip point is primarily determined by the geometry and is relatively independent of electrical parameters. Closure of the output contacts energizes a heater which melts the frost.

I claim:

1. A frost detector for use in refrigeration apparatus having refrigerant-containing coils equipped with cooling fins comprising an emitter mounted in a support for emitting a narrow beam of pulsed infrared radiation, a detector of narrow field of view mounted in said support for detecting reflected infrared radiation, the emitter and detector being angled toward each other so that the beam of the emitter and the field of view of the detector intersect at a predetermined distance from said support, which distance is about equal to the distance between said support and the plane containing the proximate edges of the cooling fins and wherein the beam emitted by said emitter is between but substantially parallel to a pair of cooling fins.

* * * * *